US005929445A

United States Patent [19]

Barone

[11] Patent Number: 5,929,445

[45] **Date of Patent: *Jul. 27, 1999**

[54] PASSIVE INFRARED DETECTOR

[75] Inventor: Stephen Barone, Dix Hills, N.Y.

[73] Assignee: Electro-Optic Technologies, LLC, Dix Hills, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/712,617

[22] Filed: Sep. 13, 1996

Related U.S. Application Data

[51] Int. Cl.$^6$ .............................. G01J 5/08; G08B 13/193

[52] U.S. Cl. ....................................... 250/353; 250/DIG. 1

[58] Field of Search .................................... 250/342, 349, 250/353, DIG. 1

[56] References Cited

U.S. PATENT DOCUMENTS

| | | |
|---|---|---|
| 3,036,219 | 5/1962 | Thompson . |
| 3,524,180 | 8/1970 | Cruse . |
| 3,631,434 | 12/1971 | Schwartz . |
| 3,703,718 | 11/1972 | Berman . |
| 3,886,360 | 5/1975 | Reiss et al. . |
| 3,958,118 | 5/1976 | Schwarz . |
| 4,321,594 | 3/1982 | Galvin et al. . |
| 4,342,987 | 8/1982 | Rossin ................................ 250/353 X |
| 4,404,468 | 9/1983 | Kleinschmidt . |
| 4,420,688 | 12/1983 | Le Bars . |
| 4,429,223 | 1/1984 | Wägli . |
| 4,429,224 | 1/1984 | Wägli et al. . |
| 4,442,359 | 4/1984 | Lederer . |
| 4,768,020 | 8/1988 | Chen ............................ 250/DIG. 1 X |
| 4,876,445 | 10/1989 | McMaster .................... 250/DIG. 1 X |
| 4,912,331 | 3/1990 | Owers . |
| 4,978,843 | 12/1990 | Yamakawa . |
| 5,266,807 | 11/1993 | Neiger . |
| 5,491,467 | 2/1996 | Tracy et al. . |

FOREIGN PATENT DOCUMENTS

| | | |
|---|---|---|
| 0050750 | 5/1982 | European Pat. Off. . |
| 0050751 | 5/1982 | European Pat. Off. . |
| 0256651 | 2/1988 | European Pat. Off. . |
| 0358929 | 3/1990 | European Pat. Off. . |
| 3615946 | 11/1987 | Germany . |
| 8712893 | 1/1988 | Germany . |
| 3803277 | 8/1989 | Germany ......................... 250/DIG. 1 |
| 3906761 | 9/1989 | Germany . |
| 54-998 | 1/1979 | Japan .................................... 250/353 |
| 3-95480 | 4/1991 | Japan .............................. 250/DIG. 1 |
| WO 92/10819 | 6/1992 | WIPO . |

*Primary Examiner*—Constantine Hannaher
*Attorney, Agent, or Firm*—Dilworth & Barrese

[57] ABSTRACT

A passive infrared detection system is described which has a wide angular field of view and a flat or nearly flat front surface. Input optical elements direct and/or focus incident peripheral infrared radiation onto one or more internal Fresnel lens arrays and/or a sensitive area of a detector, including radiation having incident angles of less than about 30°. Because of the absence of protruding elements improved performance and greater functionality can be obtained by employing larger or multiple infrared input windows and/or opto-electronic sections without degrading the aesthetic appearance of the unit.

5 Claims, 7 Drawing Sheets

PASSIVE INFRARED DETECTOR

BACKGROUND OF THE INVENTION

1. Field of the Invention

The present invention relates to an improved wide angle passive infrared system for detecting the presence of an infrared source and/or the presence of an infrared source entering, exiting or moving within a specific angular field of view and range.

2. Description of the Related Art

Motion detectors, intrusion alarms, occupancy sensors and other passive infrared radiation detection systems employ an infrared lens-detector system with an electrical output signal which varies by a measurable amount as a source of infrared radiation enters, exits or moves within its angular field of view and range. The detector output electrical signal is amplified and employed, for example, to activate an alarm, switch or other control system. The lens-detector system consists of a one or two-dimensional array of Fresnel lenses on a thin strip or sheet each of which focuses incident infrared radiation in a specific angular range onto a sensitive area of a detector. In the prior art a wide angular field of view is achieved by employing an array of Fresnel lenses on a strip or sheet which protrudes from the front surface of the unit. The protruding sectors collect infrared radiation from peripheral angles.

FIG. 1 is a schematic of the configuration of the lens-detector system for motion detectors, intrusion alarms, occupancy sensors and similar systems according to the prior art. A thin, segmented strip or sheet forming an array 10 covers the entrance aperture and extends to the exterior of the lens-detector system; i.e. exterior to the housing 12. A section of a Fresnel lens 14 is molded or cut into each sector of the strip or sheet. In the schematic twelve sectors are indicated. Each individual Fresnel lens focuses incident infrared radiation at some angle onto one edge of a sensitive area of a detector. For example, the Fresnel lens 14 focuses the beam of infrared radiation indicated onto a sensitive area 16 of a detector 18.

As the angle 20 increases the focal spot moves across the sensitive area 16 of the detector 18 and eventually moves off the opposite edge of the sensitive area 16. The change in the electrical output signal of the detector 18 as a focal spot moves on or off the sensitive area 16 is interpreted as an infrared source moving across one of the critical angles for which the focal spot is on the edge of the sensitive area 16 of the detector 18.

For a single infrared source within the overall field of view of the lens strip or sheet 10 there is a multiplicity of focal spots which move across the sensitive area 16 of the detector 18 as the source moves through the overall field of view of the system. An example of this is illustrated in the schematic of FIG. 2. Incident infrared radiation from the enclosed angular ranges 22, for example, is focused onto the corresponding sensitive area 16 of at least one detector 18 by one sector of the Fresnel lens array 10. Infrared radiation incident from the open angular ranges 24, for example, does not lead to a focal spot on a sensitive area of any detector. Thus the intensity of radiation on a sensitive area of one of the detectors will vary significantly as the infrared source moves into or out of one of the enclosed angular ranges. The resulting detector output signal is processed electronically to activate an alarm, switch or other control system.

The configuration of the Fresnel lens to be exterior to the housing allows radiation detection systems of the prior art to detect radiation over a wide range of angles of incidence 20, including low angles such as angles less than about 30°. As shown in FIG. 1, angle of incidence 20 refers to the remainder ($\pi/2$) of the angle from the perpendicular to the surface. The angle of incidence 20 is measured relative to the exposed surface. Heretofore, such exterior positioning of the Fresnel lens may not be aesthetically appealing, and further may be suspectable to damage as well as accidents or injury. For example, a detector positioned for detecting people may be brushed against or otherwise contact such people, including children. As such, the exterior Fresnel lens may cause harm to such people.

In the prior art, the positioning of the Fresnel lens or other mechanisms internal to a housing may be more aesthetically pleasing and less susceptible to damage and injury, but such internal configurations heretofore reduce the range of detection, in which low angles of incidence 20 less than, for example, about 30° are not detectable.

SUMMARY OF THE INVENTION

Wide angle motion detectors, intrusion alarms, occupancy sensors and other passive infrared detection systems would be aesthetically more pleasing and less intrusive if the face of the unit was flat or nearly flat, while allowing for the detection of radiation having low angles of incidence, such as peripheral angles of less than about 30°. This would greatly enhance the value of these units in some installations. Also, sensitivity, range, angular field of view, angular resolution and other measures of performance can be improved over that of the prior art by employing larger or multiple infrared input windows which do not protrude and hence do not degrade the appearance of the unit or interfere with other functions.

A wide angle passive infrared motion detector with a flat or nearly flat front surface can be achieved by inverting the Fresnel lens array across the plane of the input aperture and/or employing input optical elements to direct and/or focus incident infrared radiation onto one or more internal Fresnel lens arrays or a sensitive area of a detector. The Fresnel lens arrays are totally within the unit but nevertheless collect, or by employing appropriate input optical elements can be made to collect, sufficient infrared radiation from peripheral angles to be useful. Each sector of the internal Fresnel lens array focuses a specific angular range of the incident infrared radiation onto one or more of the sensitive areas of one or more detectors. In order to increase the collecting power of the system and reduce the required width of the unit curved mirrors, lenses or prisms can be employed to direct and/or focus the incident infrared radiation onto an internal Fresnel lens array and/or a sensitive area of a detector.

In one embodiment of the invention one or more prisms which span the entire or almost the entire entrance aperture are employed to direct incident infrared radiation from peripheral angles towards the center of the unit. The orientation of the exit faces of the prism set can be chosen in such a way as to direct and/or focus the infrared radiation onto an appropriate sector of one or more conveniently placed internal Fresnel lens arrays and/or a sensitive area of a detector.

BRIEF DESCRIPTION OF THE DRAWINGS

The features of the disclosed passive infrared detector will become more readily apparent and may be better understood by referring to the following detailed description of illustrative embodiments of the present invention, take in conjunction with the accompanying drawings, in which.

DETAILED DESCRIPTION OF THE PREFERRED EMBODIMENTS

Figure 3:
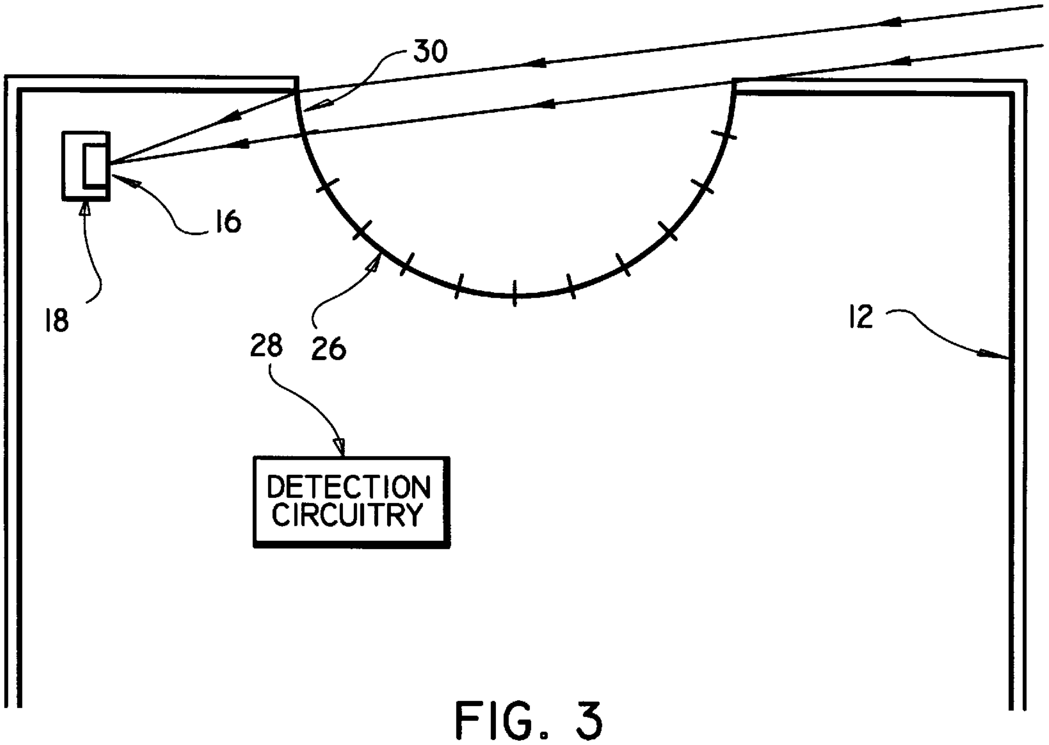
FIG. 3 is a schematic drawing of a system employing an inverted, concave Fresnel lens array-detector combination according to the present invention.

Referring now in specific detail to the drawings, with like reference numerals identifying similar or identical elements, as shown schematically in FIG. 3, the present disclosure describes a passive infrared detector system including a unit having an inverted Fresnel lens array 26, a detector 18 having a sensitive area 16, and detection circuitry 28 disposed in a housing 12 according to the present invention. Because the Fresnel lens array 26 is inverted from the manner in which it has been employed in prior art; i.e. the Fresnel lens array 26 is disposed internal to the overall detector system within the housing 12, the angular ranges of infrared radiation processed by each Fresnel lens 30 are inverted left to right in the schematic, and may also detect peripheral radiation having angles of incidence of less than about 30°.

Figure 1:
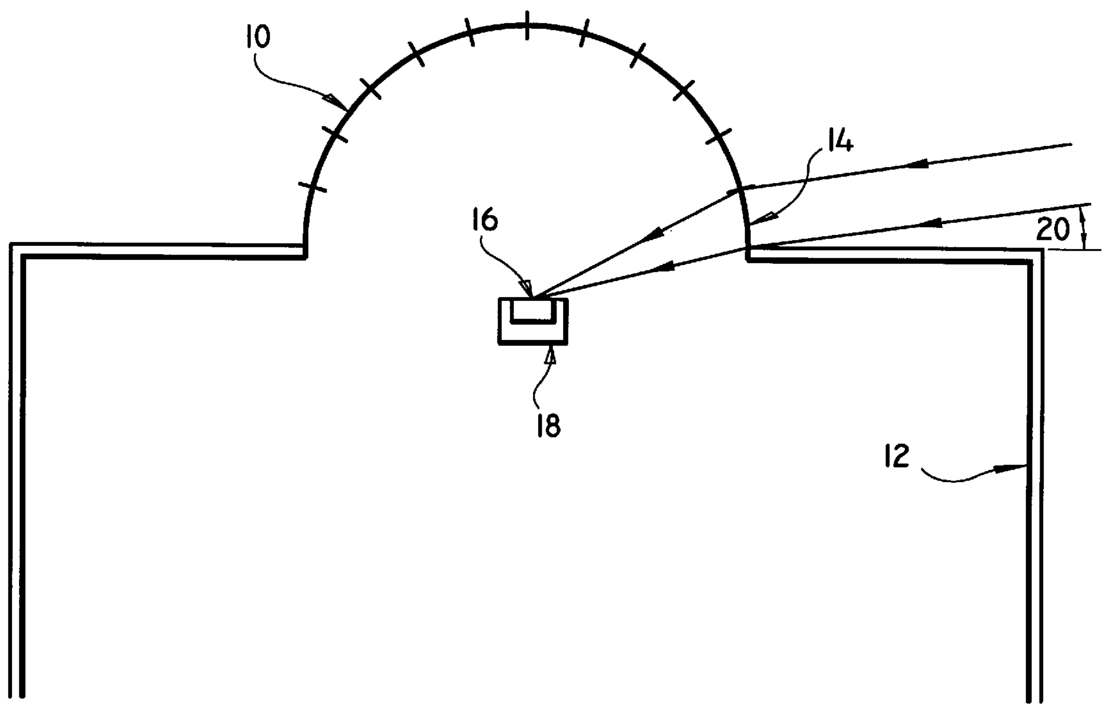
FIG. 1 (PRIOR ART)
FIG. 1 schematically depicts the configuration of the Fresnel lens array-detector system according to prior art.
Figure 2:
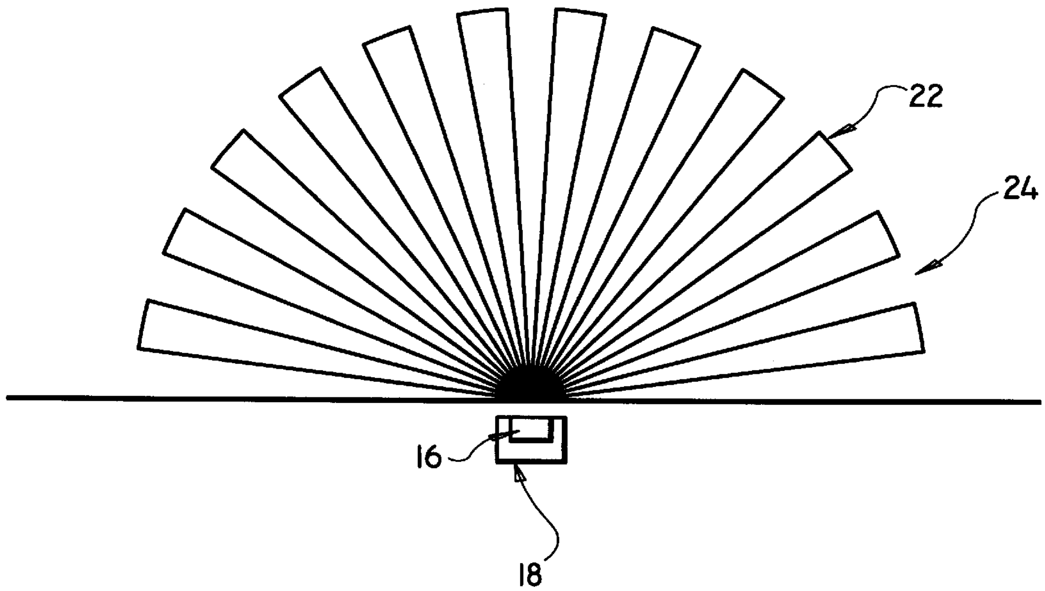
FIG. 2 (PRIOR ART)
FIG. 2 schematically depicts an example of the fields of view of each of the sectors of a Fresnel lens-detector combination in a one-dimensional, twelve element array and the intervening angular regions which are not in the field of view of any of the Fresnel lens-detector combinations.

For example, as opposed to the beam of infrared radiation indicated in the schematic of FIG. 1 which falls on the right-most sector 14 of the Fresnel lens array 10, a corresponding beam of infrared radiation indicated in the schematic of FIG. 3 falls on the left-most sector 30 of the Fresnel lens array 26 in FIG. 3. This sector 30 of the Fresnel lens array 26 focuses the incident infrared radiation onto the sensitive area 16 of a detector 18. Similarly each sector of the Fresnel lens array 26 focuses a specific angular range of the incident infrared radiation onto a sensitive area of a detector; for example, sector 30 may focus radiation incident at angles ranging between about 5° to about 10° onto sensitive area 16.

It is understood that one skilled in the art can form and/or bend a Fresnel lens to focus received radiation to a predetermined angle, and also that an array or set of Fresnel lens segments or sections may be formed as a sheet or strip in a manner known in the art. As shown in the illustrative embodiment of FIG. 3, the Fresnel lens array 26 is configured to be generally concave with the curved portion oriented away from the entrance window of the exposed surface. In other embodiments, the Fresnel lens array 26 may have a generally convex configuration. It should be understood that the sectors of the Fresnel lens array may be individually substantially planar but angularly positioned with respect to each other to provide a generally concave or a generally convex configuration.

Figure 11:
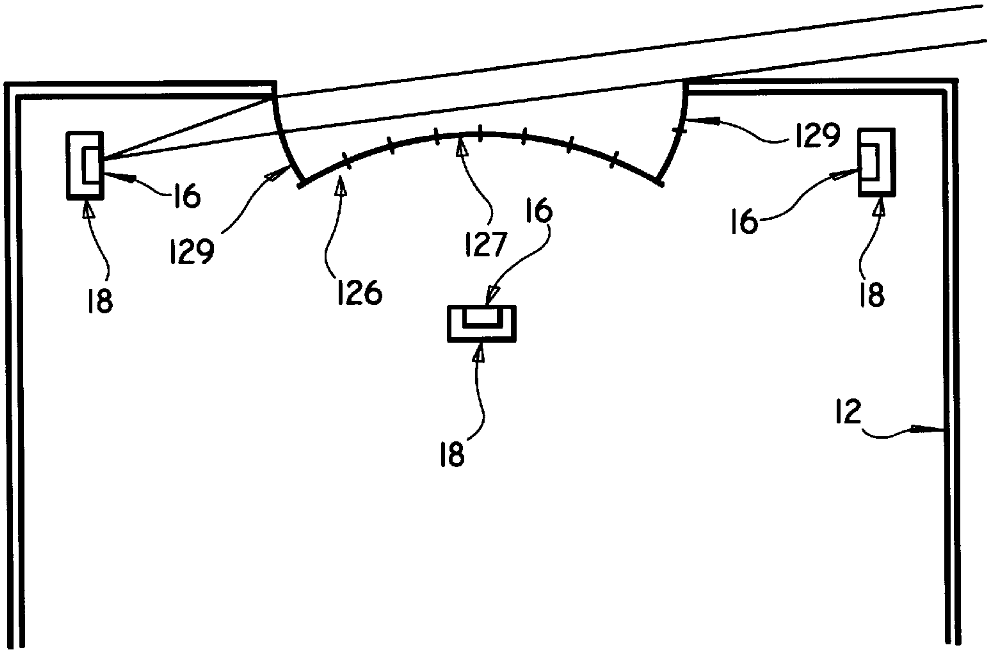
FIG. 11 is a schematic drawing of a detector including a Fresnal lens array having a compound configuration.

It is also contemplated that the Fresnal lens array may have a compound configuration. By the term compound configuration it is meant that the lens array includes at least two different portions that are of different configuration. Thus, for example, one portion of the lens array can have a generally concave configuration while another portion of the lens array is either planar or convex. One such lens array having a compound configuration is shown in FIG. 11 wherein the center portion 127 of lens array 126 has a generally convex configuration while end portions 129 have a generally concave configuration. As will be appreciated, the convex center portion 127 does not interfere with the detection of low angle radiation by end portions 129.

Figure 4:
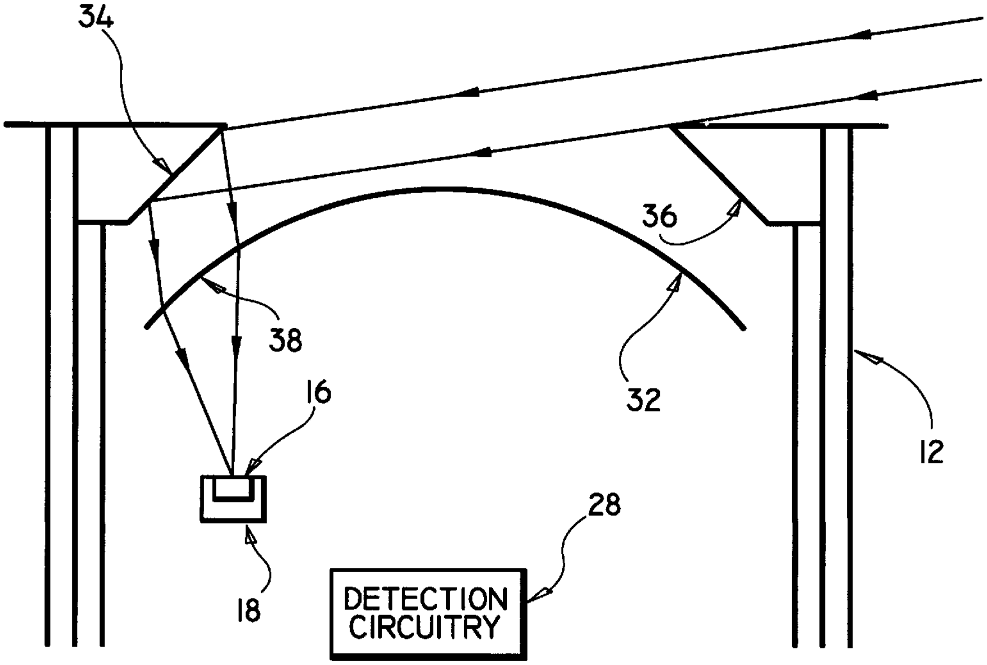
FIG. 4 is a schematic drawing of an alternative embodiment of the present invention employing an internal, convex Fresnel lens array and mirrors on the sides of the entrance aperture.

FIG. 4 is a schematic drawing showing an alternative embodiment of a lens-detector unit having an internally disposed Fresnel lens array 32 in a housing 12 which includes mirrors 34, 36 disposed at opposing sides of an entrance aperture or access window. In the illustrative embodiment shown in FIG. 4, the Fresnel lens array 32 is configured to be convex with the curved portion oriented toward the entrance window of the exposed surface. In other embodiments, the Fresnel lens array 32 may have a concave configuration. The mirrors 34, 36 are employed to direct peripheral infrared radiation, such as radiation incident at less than about 30°, towards a sector 38 of the internal Fresnel lens array 32 and/or a sensitive area 16 of a detector 18 disposed substantially nearer to the center of the unit. This reduces the necessary width of the unit which is important in some applications, such as implementations configured and dimensioned to be positioned in standard wall electrical boxes, such as in apertures dimensioned to be about 2 inches wide by about 3 inches high by about 2 inches in depth.

In another alternative embodiment, the mirrors can be curved to focus the incident radiation directly onto the sensitive area of a detector, and so some sectors of the Fresnel lens array, or alternatively the entire Fresnel lens array, are not employed. For example, multiple detectors (not shown in FIG. 4) such as detector 18 may be oriented for receiving the radiation directed internally to the unit. More than one set of mirrors may also be employed for providing sufficient angular coverage to receive incident radiation.

Figure 5:
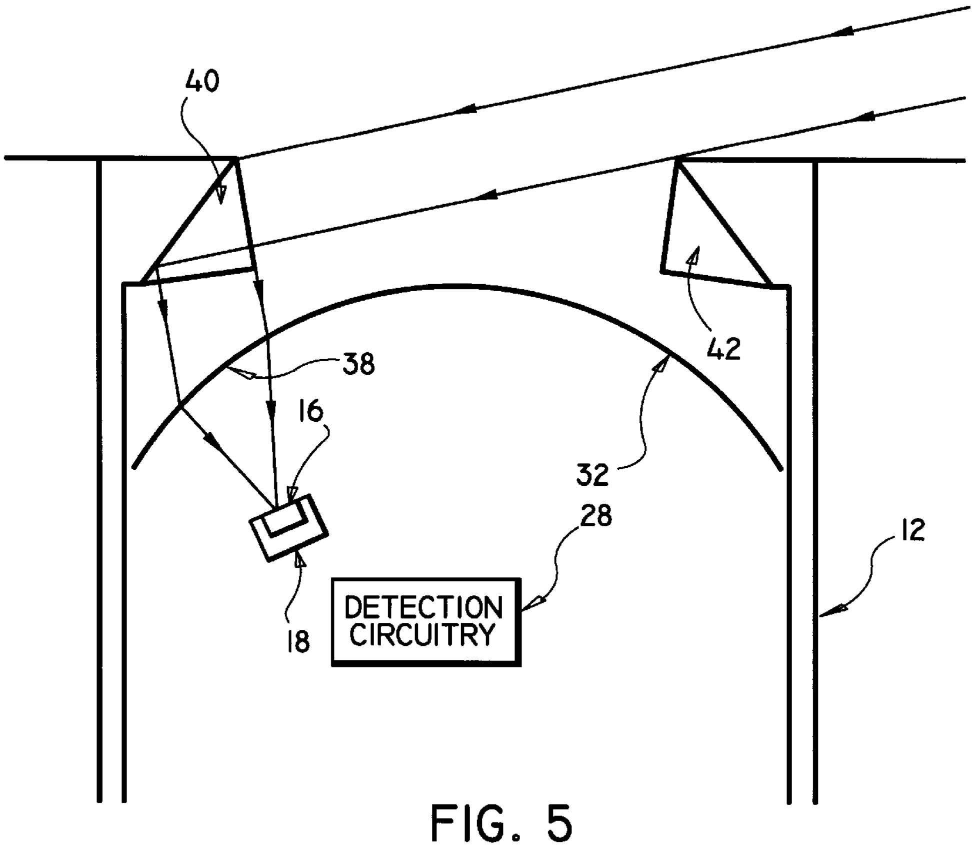
FIG. 5 is a schematic drawing of an alternative embodiment of the present invention employing an internal, convex Fresnel lens array and prisms on the sides of the entrance aperture.

FIG. 5 is a schematic of another alternative embodiment of the invention which employs prisms 40, 42 to direct and/or focus incident infrared radiation towards a sector 38 of the Fresnel lens array 32 and thence to a sensitive area 16 of a detector 18 internally disposed in a housing 12. Alternatively, the unit may use such prisms 40, 42 to directly focus the incident infrared radiation onto the sensitive area 16 of the detector 18 without employing the Fresnel lens array 32 or sectors 38 thereof.

Figure 6:
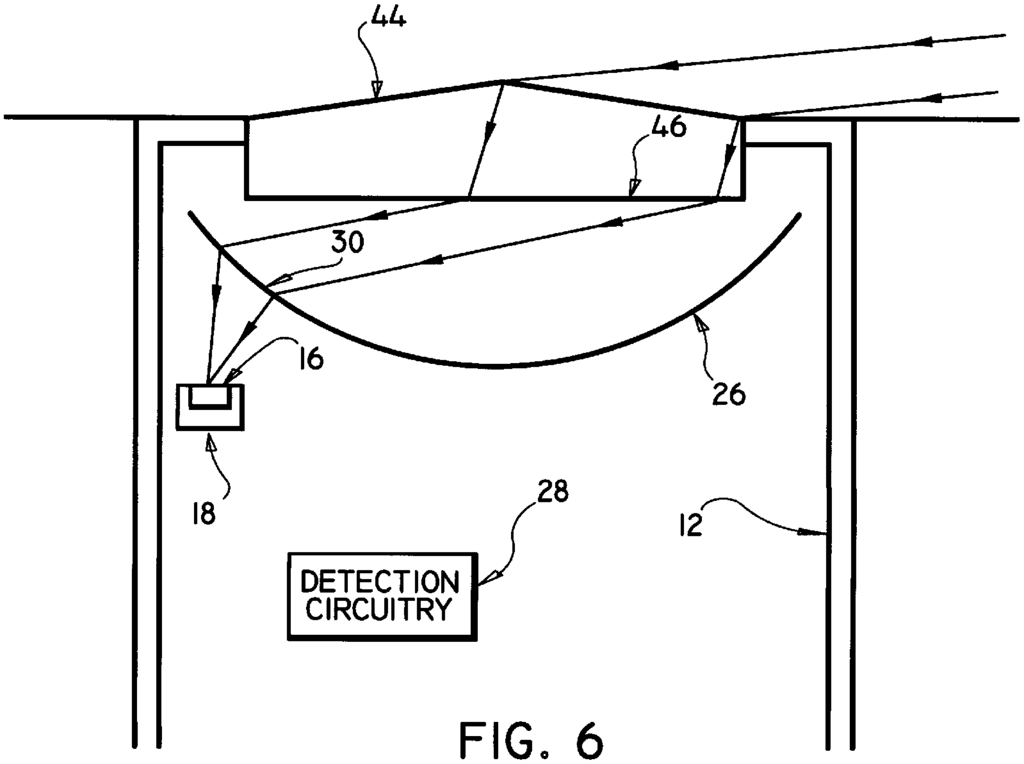
FIG. 6 is a schematic drawing of an alternative embodiment of the present invention employing a concave internal Fresnel lens array and an input prism which spans the entire entrance aperture.

FIG. 6 is a schematic of an alternative embodiment of the invention having at least one input prism 44 which spans or nearly spans the entire entrance aperture of the unit. The at least one input prism 44 has at least one exit face 46 and collects and directs peripheral infrared radiation through the at least one exit face 46 towards the interior of the unit in which is disposed a Fresnel lens array 26 having at least one sector 30 for directing the infrared radiation toward a sensitive area 16 of a detector 18 disposed within a housing 12. The orientation of the exit faces 46 of the at least one prism 44 determines the direction and width of the infrared beams that emerge therefrom. In passing through a thick input prism 44 the beam width may be enlarged or compressed depending on the angle between the entrance and exit faces of the prism 44. This effect may be employed to increase or decrease the sensitivity of the system; i.e. the angular range over which the source must move in order for the focal spot to move across the sensitive area 16 of the detector 18. This effect can be enhanced or reduced by adjusting the angle of orientation of the Fresnel lens sector relative to the beam which it is processing. As described above for other embodiments, the Fresnel lens array 26 may not be employed.

Figure 7:
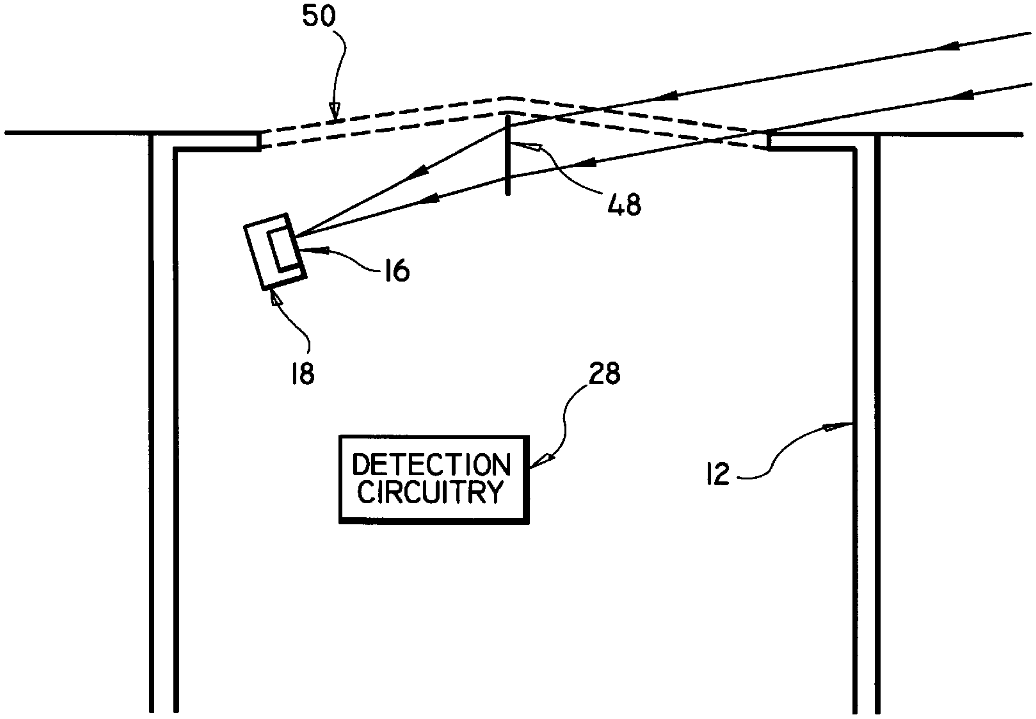
FIG. 7 is a schematic drawing of an alternative embodiment of the present invention employing an input window and a lens near the entrance aperture.

FIG. 7 is a schematic displaying an example of an alternative embodiment of the invention which employs one or more lenses 48 disposed in or near the entrance aperture of the unit to direct and/or focus incident infrared radiation towards a sector of an internal Fresnel lens array (not shown in FIG. 7) and/or onto a sensitive area 16 of a detector 18 disposed within the housing 12 of the unit. An entrance window 50 may also be disposed substantially adjacent the entrance aperture, as described in detail below.

Figure 8:
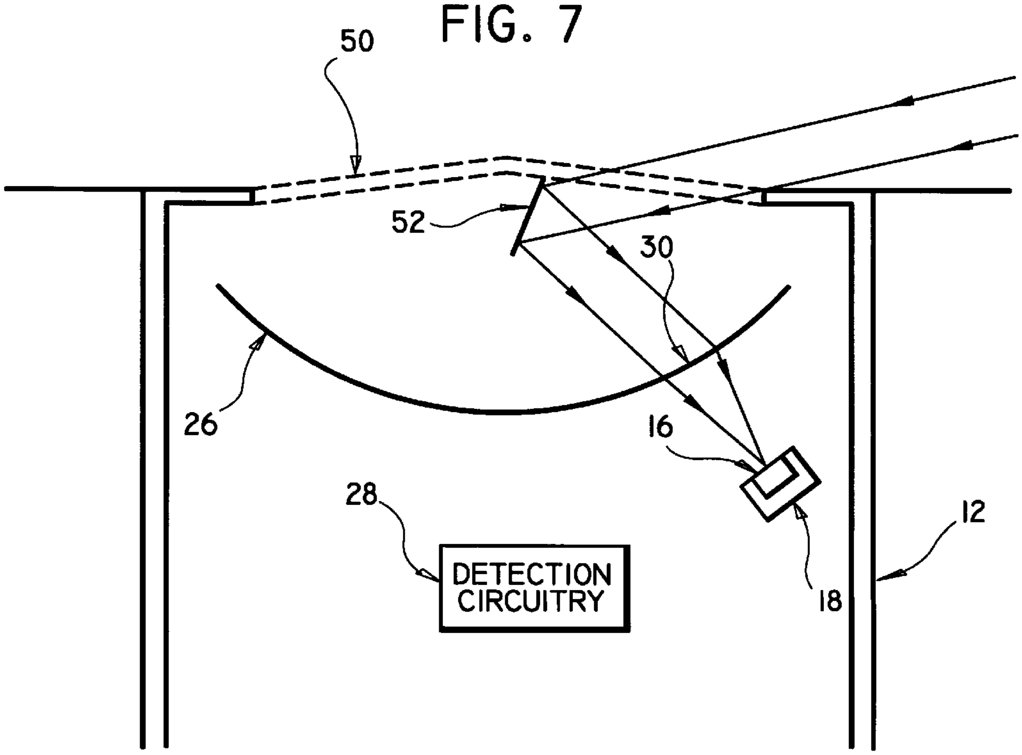
FIG. 8 is a schematic drawing of an alternative embodiment of the present invention employing an internal Fresnel lens array, an input window and a mirror near the entrance aperture.

FIG. 8 is a schematic displaying an example of a further alternative embodiment of the invention employing one or more plane or curved mirrors 52 in or near the entrance aperture to direct and/or focus incident infrared radiation towards a sector 30 of a Fresnel lens array 26 and/or onto a sensitive area 16 of a detector 18 internally disposed within a housing 12 of the unit. An entrance window 50 may also be disposed substantially adjacent the entrance aperture, as described in detail below.

Figure 9:
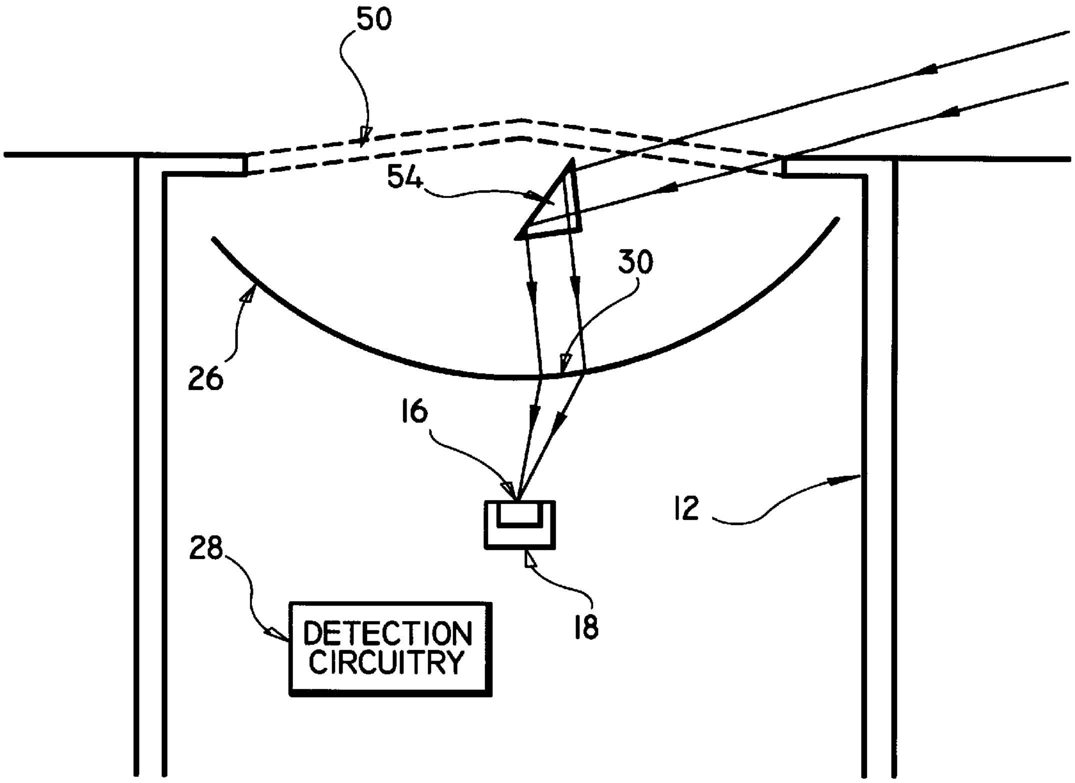
FIG. 9 is a schematic drawing of an alternative embodiment of the present invention employing an internal Fresnel lens array, an input window and a prism near the entrance aperture.

FIG. 9 is a schematic displaying an example of another alternative embodiment of the invention employing one or more prisms 54 disposed in or near the entrance aperture to direct and/or focus incident infrared radiation onto a sector 30 of a Fresnel lens array 26 and/or a sensitive area 16 of a detector 18 internally disposed within a housing 12. An entrance window 50 may also be disposed substantially adjacent the entrance aperture or access window, as described in detail below.

In each of the embodiments of the invention shown above, the entrance aperture or access window of the unit may be covered with a thin entrance window 50, respectively, having a slight outward curvature as indicated, for example, by the dashed lines in FIGS. 7–9. The slight outward curvature of the entrance window 50 reduces the Fresnel reflection of peripheral infrared radiation at the window surfaces. Alternatively, an input prism set can be employed as described above with respect to the embodiment illustrated in FIG. 6 to direct and/or focus input infrared radiation towards the interior or center of the unit.

Figure 12:
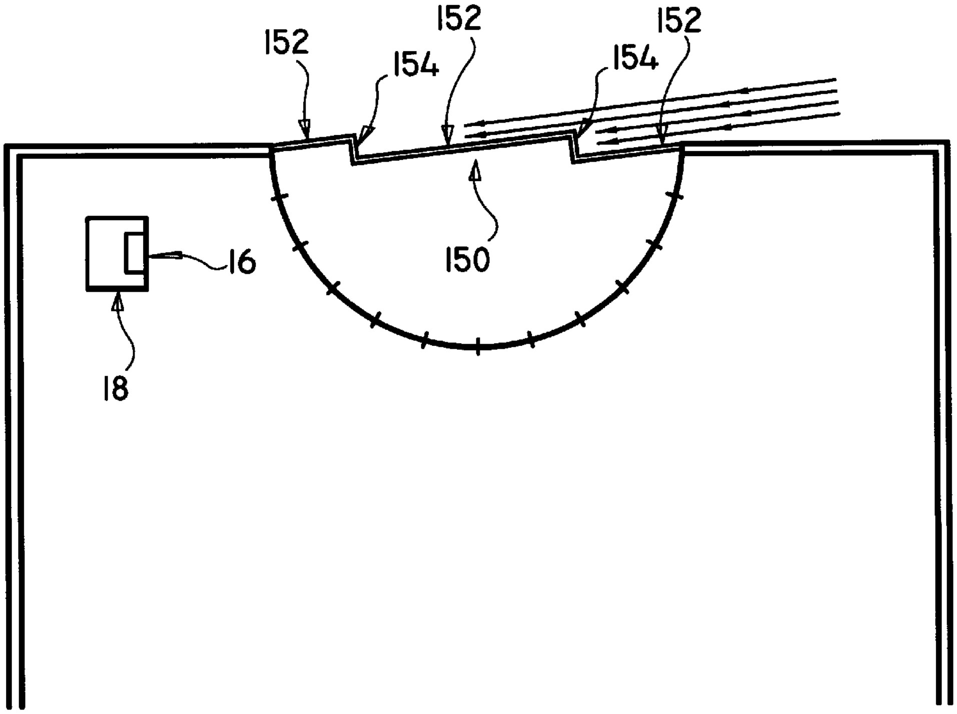
FIG. 12 is a schematic drawing of a detector including a stepped window to reduce reflection of radiation.

It is also contemplated that the opening in the housing may be covered by a stepped access window to prevent reflection of radiation received at low angles of incidence. Specifically, as seen in FIG. 12, window 150 includes stepped surfaces 154 that are configured to provide a surface highly angled with respect to low angle radiation. Thus, while low angle radiation contacting portions 152 of window 150 might in large part be reflected, the radiation contacting portion 154 is transmitted directly into the housing, thereby enhancing the detection of radiation having a low angle of incidence.

Figure 13:
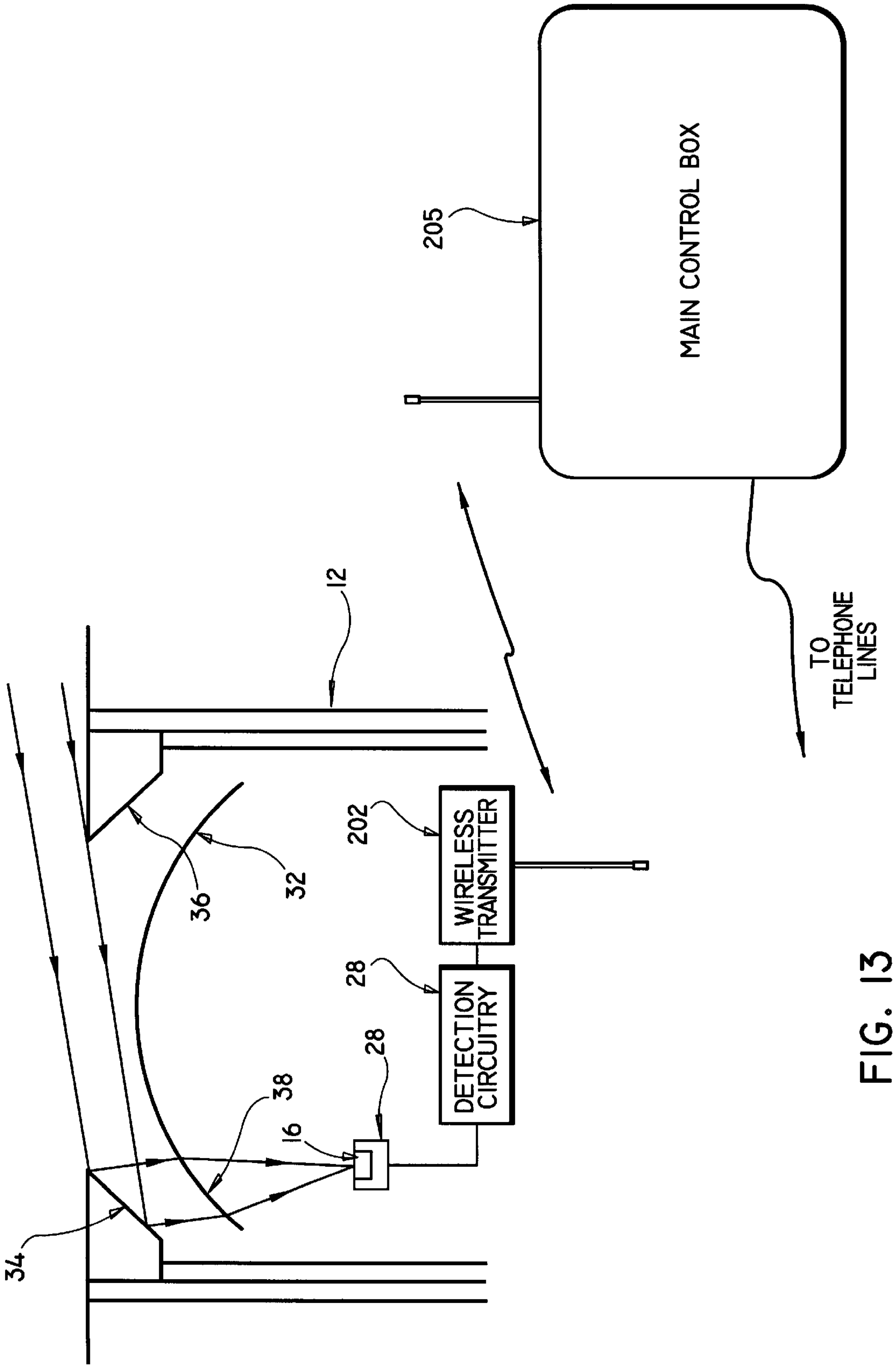
FIG. 13 is a schematic drawing of an intruder detection system including the flush mount detectors described herein.

It is to be understood that the units shown in FIGS. 3–9 may also include detection circuitry known in the art which is connected to the respective detectors and disposed internal to the respective housing, or alternatively located remote from the respective housings. Thus, for example, as shown in FIG. 13, the detector may include a wireless transmitter 202 positioned within the wall or ceiling in which the detector housing is installed. When the detector senses an intruder, wireless transmitter 202 is activated and sends a signal to a main control box 205 located a distance from the detector. The main control box 205 activates an alarm or contacts a central monitoring station or the police in a manner known to those skilled in the art. Thus, the detectors described herein remove the need for surface-mounted detector units. Instead, the present flush mount detectors are installed to replace a room's light switch and can require no special wiring to provide an intruder detector. An override switch (not shown) is preferably provided to allow manual operation of the light switch or to deactivate the intruder alarm mechanism when desired.

In an illustrative embodiment, the present invention may include units having components disposed in a respective housing, as shown in FIGS. 3–9, in which the housing may be configured and dimensioned to fit in a standard electrical box, or alternatively into an aperture of a wall or ceiling. For example, the respective housing 12 may be about 2 inches wide, about 3 inches high, and about 2 inches in depth for positioning the entire lens-detection unit in a wall or ceiling of a building, such as a residential house as a component of an anti-theft system.

As described above, the present invention includes means internally disposed within the housing for directing the received radiation from the substantially flat surface onto the sensitive region of the detector. Accordingly, the directing means is defined herein as the aforesaid Fresnel lenses, arrays thereof, mirrors, lenses, prisms, etc., individually or in combinations thereof, such as respectively described above with reference to FIGS. 3–9. It is understood that other configurations of Fresnel lenses, arrays thereof, mirrors, lenses, prism, etc., not shown in FIGS. 3–9 are also contemplated.

As described above for FIGS. 3–9, since the directing means is internally disposed within the housing, the units may have a flat or substantially flat exposed surface, providing minimal external protrusion which avoids accidental injury or damage, and providing greater aesthetic appearance.

Figure 10:
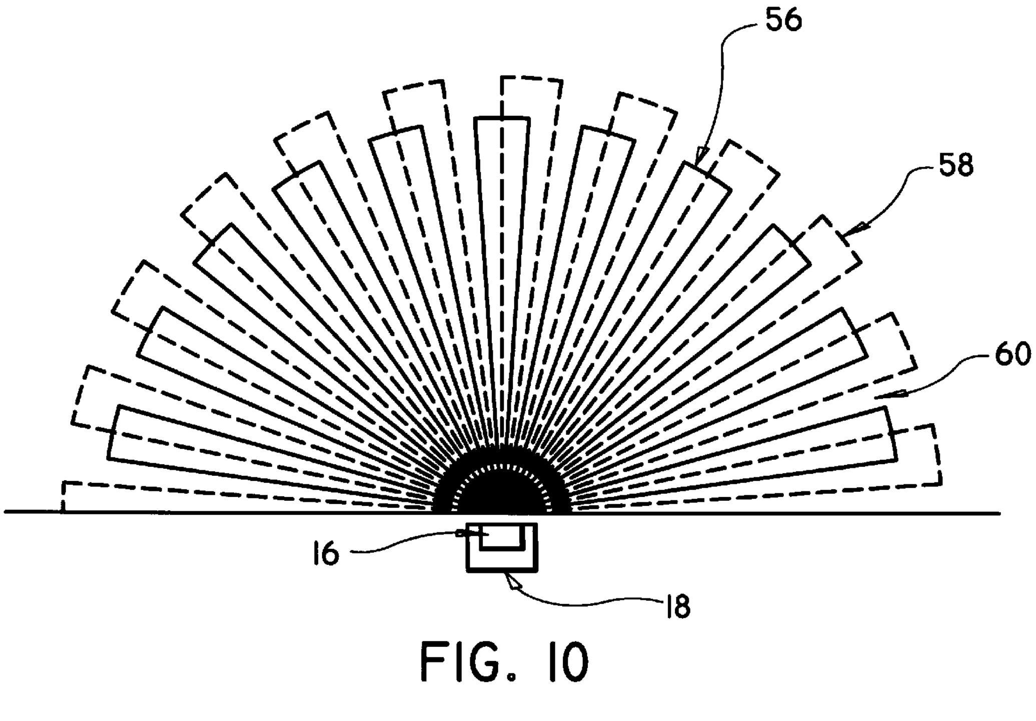
FIG. 10 is a schematic drawing illustrating a technique for increasing the angular resolution and functionality of passive infrared detection systems by employing multiple opto-electronic sections with overlapping fields of view.

Because of the flat or substantially flat surface of the units described in FIGS. 3–9 which are exposed outward to which radiation is incident, larger and/or multiple infrared input windows and lens-detector combinations can be employed without degrading the appearance of the unit. This allows sensitivity, range, angular field of view, angular resolution and other measures of performance to be improved over devices of the prior art because of the greater collecting power of larger and/or multiple windows. In particular, the greater collecting power for peripheral infrared radiation increases the range of the system at peripheral angles. In addition, multiple lens-detector combinations with overlapping fields of view can be employed to increase the angular resolution of the system. This is illustrated in the schematic of FIG. 10 with two infrared input sections and the corresponding lens-detector combinations (not shown in FIG. 10), which have, for example, a first input section focusing infrared radiation from the closed angular sectors 56 onto a sensitive area 16 of a detector 18. A second input section may then focus infrared radiation from closed angular sectors 58, illustrated by dashed lines in FIG. 10, onto the sensitive area 16, or alternatively on a different sensitive area (not shown in FIG. 10) of the detector 18 or alternatively on another detector (not shown in FIG. 10).

Infrared radiation from the open angular sectors 60 may not be focused onto any detector, but the degree or extent of such open angular sectors 60 may be minimized by the use of multiple lens-detector combinations with overlapping fields of view. If all of the angular sectors in FIG. 10 are of the same size, electronic processing of the two detector outputs by a logic circuit, which may be included in detection circuitry, such as the detection circuitry 28 shown in FIGS. 3–9, yields an angular resolution of, for example, one-half of the angular size of any one sector.

For clarity of explanation, the illustrative embodiments of the disclosed passive infrared detector are presented as having individual functional blocks, which may include functional blocks labelled as “detector” and “detection circuitry”. The functions represented by these blocks may be provided through the use of either shared or dedicated hardware, including, but not limited to, hardware capable of executing software.

While the disclosed passive infrared detector have been particularly shown and described with reference to the preferred embodiments, it is understood by those skilled in the art that various modifications in form and detail may be made therein without departing from the scope and spirit of the invention. For example, movable or adjustable lenses, mirrors, and prisms, with appropriate structure or control mechanisms, may be employed as the internally disposed means for directing received radiation to the sensitive regions of at least one detector. Accordingly, modifications such as those suggested above, but not limited thereto, are to be considered within the scope of the invention.

What is claimed is:

1. A radiation detection system comprising:

a housing having a surface having an opening for receiving radiation, means disposed within the housing adjacent to the opening for directing the received radiation to the interior of the housing, wherein the directing means includes at least one mirror adjacent an edge of the opening;

at least one detector; and a Fresnel lens array disposed within the housing and positioned between the means for directing the received radiation and the at least one detector, the Fresnel lens focussing the received radiation onto the at least one detector.

2. A radiation detection system comprising:

a housing having a surface having an opening for receiving radiation, means disposed within the housing adjacent to the opening for directing the received radiation to the interior of the housing;

at least one detector; and a Fresnel lens disposed within the housing and positioned between the means for directing the received radiation and the at least one detector, the Fresnel lens focussing the received radiation onto the at least one detector, wherein the Fresnel lens comprises a Fresnel lens array configured in a generally convex orientation.

3. A radiation detection system comprising:

a housing having a surface having an opening for receiving radiation;

means disposed within the housing adjacent to the opening for directing the received radiation to the interior of the housing;

at least one detector; and a Fresnel lens disposed within the housing and positioned between the means for directing the received radiation and the at least one detector, the Fresnel lens focussing the received radiation onto the at least one detector, wherein the Fresnel lens comprises a Fresnel lens array configured in a generally concave orientation.

4. A radiation detection system comprising:

a housing including a surface having an opening for receiving radiation;

at least one detector; and a lens internally disposed within the housing for directing the received radiation having an angle of incidence to the plane of the surface of less than about 30° to the at least one detector, wherein the lens is oriented to be perpendicular to the plane of the surface.

5. The radiation detection system of claim 4 wherein the lens is positioned substantially near the center of the opening in the housing.

* * * * *